US007288932B2

(12) United States Patent
Dufour et al.

(10) Patent No.: US 7,288,932 B2
(45) Date of Patent: Oct. 30, 2007

(54) DEVICE TO CORRECT INTERFERENCE ERRORS BETWEEN MAGNETIC SENSORS FOR MEASURING THE POSITION OF MOBILE ELEMENTS

(75) Inventors: Laurent Dufour, Saint-Maurice de Gourdans (FR); Olivier Andrieu, Saint Maurice de Beynost (FR); Rainer Moller, Loyettes (FR)

(73) Assignee: Electricfil Automotive, Miribel Cedex (FR)

( * ) Notice: Subject to any disclaimer, the term of this patent is extended or adjusted under 35 U.S.C. 154(b) by 0 days.

(21) Appl. No.: 10/575,015

(22) PCT Filed: Oct. 8, 2004

(86) PCT No.: PCT/FR2004/002543

§ 371 (c)(1), (2), (4) Date: Aug. 23, 2006

(87) PCT Pub. No.: WO2005/036101

PCT Pub. Date: Apr. 21, 2005

(65) Prior Publication Data

US 2007/0126418 A1 Jun. 7, 2007

(30) Foreign Application Priority Data

Oct. 9, 2003 (FR) .................................. 03 11811

(51) Int. Cl.
*G01B 7/14* (2006.01)

(52) U.S. Cl. .......................... 324/207.12; 324/207.24; 324/207.2

(58) Field of Classification Search .............................. 324/207.12–207.25
See application file for complete search history.

(56) References Cited

U.S. PATENT DOCUMENTS 4,746,859 A * 5/1988 Malik .................... 324/207.12
4,810,965 A 3/1989 Fujiwara et al.
5,210,501 A 5/1993 Schneider et al.
6,717,399 B2 * 4/2004 Luetzow et al. ....... 324/207.12

* cited by examiner

*Primary Examiner*—Jay M Patidar
(74) *Attorney, Agent, or Firm*—Dennison, Schultz & MacDonald

(57) ABSTRACT

A device to correct interference errors in a measuring installation (A) that includes at least two magnetic sensors (1$_1$, 1$_2$) for measuring the position of mobile elements (2$_1$, 2$_2$) that are moving along adjacent trajectories, with each magnetic measuring sensor delivering a measurement signal that is representative of the position of the mobile element in an open magnetic circuit (3$_1$, 3$_2$), and resources (M) for processing the measurement signals delivered by the magnetic measuring sensors. According to the invention, the processing resources (M) include resources for correction of the magnetic measurement signals in order to take account of interference errors between adjacent magnetic sensors (1$_1$, 1$_2$), with a view to obtaining a corrected measurement signal for each magnetic measuring sensor.

17 Claims, 3 Drawing Sheets

$4_2$
$2_2$
$1_2$
A
$4_1$
$2_1$
$1_1$
$3_2$
$3_1$
M 0.04
0.03
0.02
0.01
0.00
-0.01
-0.02
-0.03
-0.04
$\Delta s_1$
-0.8 -0.6 -0.4 0.2 0.0 0.2 0.4 0.6 0.8
$s_2$ 0.03
0.02
0.01
0.00
-0.01
-0.02
-0.03
$\delta$
-1.5 -1.0 -0.5 0.0 0.5 1.0 1.5
$s_1 - s_2$ $3_1$
F
$2_1$
$f_1$
$4_1$
$T_1$
$11_1$
$6_1$
$8_1$
$1_1$
$5_1$
P2
P1

$4_1$
$T_1$
$13_1$
$11_1$
P1
$6_1$
P2
$5_1$ $14_1$
$4_1$
A
$13_1$
$11_1$
$5_1$ $15_1$
$13_1$
$11_1$
$5_1$

DEVICE TO CORRECT INTERFERENCE ERRORS BETWEEN MAGNETIC SENSORS FOR MEASURING THE POSITION OF MOBILE ELEMENTS

This application is a filing under 35 USC 371 of PCT/FR2004/02543, filed Oct. 8, 2004.

This present invention concerns the technical area of contactless magnetic sensors designed to locate the position of a mobile element that is in motion along a movement axis, preferably linear.

The subject of the invention has a particularly advantageous application in the area of motor vehicles, though not exclusively so, with a view to equipping different moving devices, particularly in linear movement, whose position has to be known, and forming part, for example, of an automatic gearbox, a suspension system, a transmission clutch, an assisted steering system, a seat regulating sensor, etc.

In previous designs, there are many types of contactless sensor designed to ascertain the linear position of a mobile element that is moving in translation. For example, patent U.S. Pat. No. 4,810,965 described a magnetic sensor that includes a closed magnetic circuit with a U-shaped polar part equipped, between its two free ends, with a magnet creating a magnetic field in a direction perpendicular to the surface of the polar part. A mobile measurement cell is mounted between the branches of the polar part in order to measure the value of the magnetic field in relation to the surface area of the polar part. Such a cell thus measures the strength of the magnetic leakage field appearing between the two branches of the polar part, where the strength of this magnetic leakage field varies with the surface area of the polar part along the axis of translation of the measuring cell. Such a sensor also includes resources for processing the output signal delivered by the measuring cell, in order to determine the linear position of the mobile element along the axis of translation.

In certain applications, such as a controlled clutch for example, a need arises to ascertain the linear position of mobile elements that are moving close to each other. The linear position of each mobile element can then be determined using a magnetic measuring sensor as described above.

The Applicant was able to observe that the measurements effected by one magnetic sensor were disrupted by the other magnetic sensor. In other words, the Applicant observed interference errors in an installation that included at least two magnetic sensors for measuring the position of mobile elements that are moving along adjacent trajectories.

The subject of the invention therefore aims to remedy the interference errors appearing in such a measuring installation. To this end, the subject of the invention aims to propose a device to correct the interference errors for a measuring installation that includes:

- at least two magnetic sensors for measuring the position of mobile elements that are moving along adjacent trajectories, with each magnetic measuring sensor delivering a measurement signal that is representative of the position of the mobile element in an open magnetic circuit,
- and resources for processing the measurement signals delivered by the magnetic measuring sensors.

According to the invention, the processing resources include resources for correction of the magnetic measurement signals in order to take account of interference errors between adjacent magnetic sensors with a view to obtaining a corrected measurement signal for each magnetic measuring sensor.

Advantageously, the correction resources correct the measurement signal of each magnetic measuring sensor according to the value of the measurement signals of the magnetic measuring sensor concerned and of the other magnetic measuring sensors.

According to one characteristic of the invention, the processing resources deliver a corrected measurement signal for each magnetic measuring sensor such that:

$$S_{1c} = \sum_{i-1}^{n} \left( \sum_{j=0}^{i} \alpha_{ij} S_1^j S_2^{i-j} \right)$$

$$S_{2c} = \sum_{i=1}^{n} \left( \sum_{j=0}^{i} \alpha'_{ij} S_2^j S_1^{i-j} \right)$$

where: α and α' are correction coefficients and n is the order of the correction.

According to an implementation variant, the processing resources deliver a corrected measurement signal for each magnetic measuring sensor, such that, for a correction order of n=3, α, i, j and α', are such that:

$$\alpha_{10}=a-c,\ \alpha_{11}=1+c$$

$$\alpha'_{10}=a'-c',\ \alpha_{11}=1+c'$$

$$\alpha_{20}=0=\alpha'_{20},\ \alpha_{21}=\alpha'_{21}=0,\ \alpha_{22}=\alpha'_{22}=0$$

$$\alpha_{30}=-b,\ \alpha_{31}=3b,\ \alpha_{32}=-3b,\ \alpha_{33}=b$$

$$\alpha'_{30}=-b',\ \alpha'_{31}=3b',\ \alpha'_{32}=-3b',\ \alpha'_{33}=b'$$

where a, b, c, a', b' and c' are correction coefficients so that:

$$S_{1c}=(1+c)S_1+(a-c)S_2+3bS_1S_2^2-3bS_1^2S_2+bS_1^3-bS_2^3$$

$$S_{2c}=(1+c')S_2+(a'-c')S_1+3b'S_2S_1^2-3b'S_2^2S_1+b'S_2^3-b'S_1^3$$

or $$S_{1c}=S_1+aS_2+b(S_1-S_2)^3+c(S_1-S_2)$$

and $$S_{2c}=S_2+a'S_1+b'(S_2-S_1)^3+c'(S_2-S_1)$$

According to another implementation variant, the processing resources deliver a corrected measurement signal for each magnetic measuring sensor such that, for a correction order n=1, the values of α, α', i and j are such that $\alpha_{10}$=a, $\alpha_{11}$=1 and $\alpha'_{10}$=a', $\alpha'_{11}$=1 so that:

$$S_{1c}=S_1+aS_2, \text{ and } S_{2c}=S_2+a'S_1$$

Advantageously, each measurement signal $S_1$, $S_2$ is such that:

$$S_1 = \frac{S_a - S_b}{S_a + S_b}$$

$$S_2 = \frac{S_d - S_c}{S_d + S_c}$$

where $S_a$, $S_b$, and $S_c$, $S_d$ are a pair of elementary measurement signals delivered by a pair of measurement cells mounted in the open magnetic circuit.

Another aim of the invention is to propose a measuring installation that includes:

- a first magnetic measuring sensor delivering a first signal for measuring the position of a first mobile element that is moving along a trajectory, where the value of the first measurement signal depends on the position of the said mobile element in an open magnetic circuit,
- at least one second magnetic measuring sensor delivering a second magnetic signal for measuring the position of a second mobile element that is moving along a trajectory adjacent to trajectory of the first mobile element, where the value of the second measurement signal depends on the position of the said mobile element in an open magnetic circuit,
- and a correction arrangement according to the invention.

Another aim of the invention is to propose a contactless magnetic sensor designed to determine the position of a mobile element, being of simple, economic design and capable of operating with a wide magnetic gap.

Thus each magnetic measuring sensor of the installation according to the invention includes resources for the creation of a magnetic flux in a direction perpendicular to the surface of at least one polar part, from which there emanates a magnetic leakage flux whose magnitude varies with the surface area of the polar part along the axis of movement, where these magnetic flux creation resources are mounted to be movable by the mobile element to form at least one magnetic gap with a polar part forming part of the open magnetic circuit, with each magnetic measuring sensor including at least one measuring cell mounted in a fixed manner in the magnetic circuit, close to an end point of the trajectory so as to measure the magnetic flux delivered by the creation resources less a magnetic leakage flux emanating from the polar part and varying along the trajectory.

For example, the magnetic flux creation resources of the two measuring sensors are mounted close to each other along parallel trajectories.

According to a preferred implementation variant, the magnetic sensor includes a second measuring cell mounted in a fixed manner in the magnetic circuit close to the other trajectory end point so as to measure the magnetic flux delivered by the creation resources less the magnetic leakage flux.

Advantageously, the magnetic flux creation resources are mounted to be movable in translation.

Advantageously, the magnetic flux creation resources are composed of a disk-shaped or annular element, magnetised radially or axially, and whose axis is parallel to the translation axis.

According to another form of implementation, the magnetic flux creation resources are composed of a series of at least four magnets whose directions of magnetisation are shifted, two by two, by 90°.

According to another form of implementation, the magnetic flux creation resources are composed of at least one magnet of at least one polar part, from which there emanates a magnetic leakage flux whose magnitude varies with the surface area of the polar part along the axis of movement, where these magnetic flux creation resources are mounted to be movable by the mobile element to form at least one magnetic gap with a polar part forming part of the open magnetic circuit, with each magnetic measuring sensor including at least one measuring cell mounted in a fixed manner in the magnetic circuit, close to an end point of the trajectory so as to measure the magnetic flux delivered by the creation resources less a magnetic leakage flux emanating from the polar part and varying along the trajectory.

For example, the magnetic flux creation resources of the two measuring sensors are mounted close to each other along parallel trajectories.

According to a preferred implementation variant, the magnetic sensor includes a second measuring cell mounted in a fixed manner in the magnetic circuit close to the other trajectory end point so as to measure the magnetic flux delivered by the creation resources less the magnetic leakage flux.

Advantageously, the magnetic flux creation resources are mounted to be movable in translation.

Advantageously, the magnetic flux creation resources are composed of a disk-shaped or annular element, magnetised radially or axially, and whose axis is parallel to the translation axis.

According to another form of implementation, the magnetic flux creation resources are composed of a series of at least four magnets whose directions of magnetisation are shifted, two by two, by 90°.

According to another form of implementation, the magnetic flux creation resources are composed of at least one magnet whose direction of magnetisation is parallel to the translation axis.

According to certain applications, the open magnetic circuit includes a second polar part placed opposite to the first polar part, creating a magnetic gap with the latter. According to this implementation variant, the second polar part is equipped with the magnetic flux creation resources.

For example, this second polar part is formed from a tubular element fitted with the radially magnetised annular element.

Advantageously, one or other of the polar parts has a plane profile designed to improve the linearity of the output signal delivered by the measurement cells.

Diverse other characteristics will emerge from the description provided below with reference to the appended drawings which show, by way of non-limiting examples, some forms of implementation of the subject of the invention.

Figure 1:
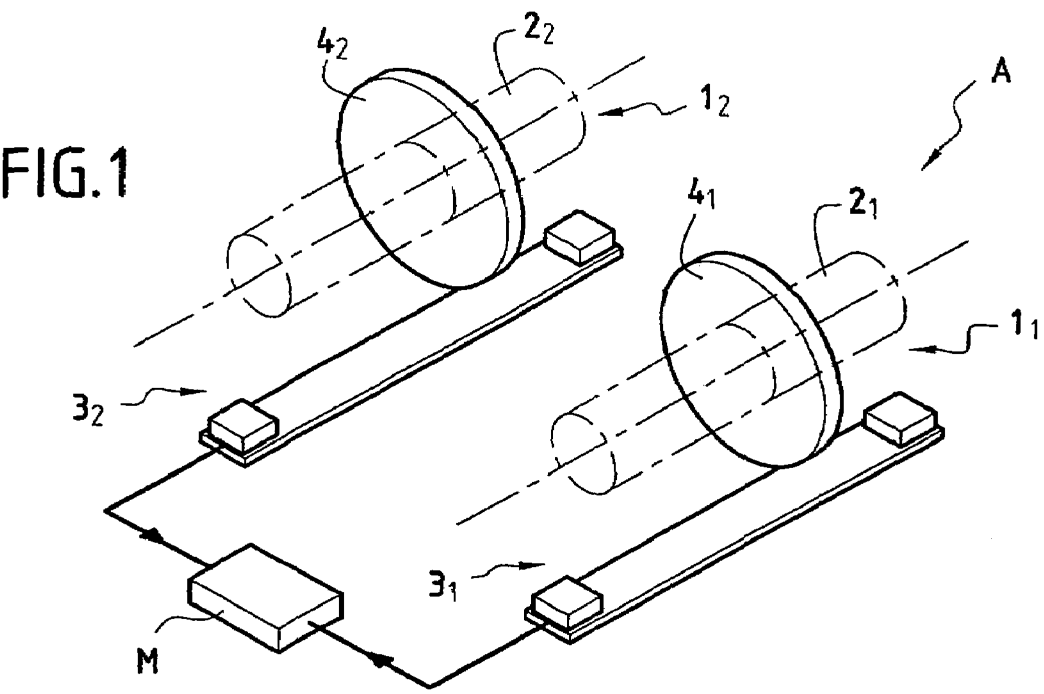
FIG. 1 is a diagrammatic view of a measuring installation that implements a correction arrangement according to the invention.

As shown in greater detail in FIG. 1, the subject of the invention concerns a device to correct interference errors in a measuring installation A that includes at least two magnetic sensors $\mathbf{1}_1$, $\mathbf{1}_2$, each designed to measure the position of a mobile element, respectively $\mathbf{2}_1$, $\mathbf{2}_2$, which are moving along adjacent trajectories. Each magnetic sensor $\mathbf{1}_1$, $\mathbf{1}_2$ includes an open magnetic circuit $\mathbf{3}_1$, $\mathbf{3}_2$ and delivers a measurement signal which is representative of the position of the mobile element $2_1$, $2_2$ in the said open magnetic circuit. This measuring installation A also includes resources M for processing the measurement signals $S_1$, $S_2$ delivered respectively by the magnetic sensors $1_1$, $1_2$.

According to the invention, the processing resources M include resources for correction of the magnetic measurement signals $S_1$, $S_2$ in order to take account of interference errors between the adjacent magnetic sensors $1_1$, $1_2$, with a view to obtaining a corrected measurement signal $S_{1c}$, $S_{2c}$ for each magnetic measuring sensor. In fact, it has been observed that the measurements performed by a sensor are disrupted by the presence of the other sensor and vice versa. The subject of the invention therefore aims to correct the magnetic measurement signals $S_1$, $S_2$ in order to take account of the interference between the sensors.

According to an advantageous implementation characteristic, the correction resources correct the measurement signal $S_1$, $S_2$ of each magnetic measuring sensor according to the value of the measurement signals of the magnetic measuring sensor concerned and of the other magnetic measuring sensors. In fact, it has been observed that the magnitude of the disruption created by a sensor is dependent upon the value taken by the said sensor and the value taken by the other sensor. Thus, for example, in the case of measurements of the linear position of two adjacent mobile elements, the measurement read by sensor $1_1$ is disrupted by the presence of mobile element $2_2$ with which sensor $1_2$ is associated. This disruption in dependent upon the position of mobile element $2_2$. Furthermore, for a given position of mobile element $2_2$, the disruption is also dependent upon the position of mobile element $2_1$. Conversely, the measurement read by sensor $1_2$ is disrupted by the presence of mobile element $2_1$, with which sensor $1_1$ is associated. This disruption is dependent upon the given position of mobile element $2_1$. Also, for a given position of mobile element $2_1$, the disruption is also dependent upon the position of mobile element $2_2$.

Figure 2:
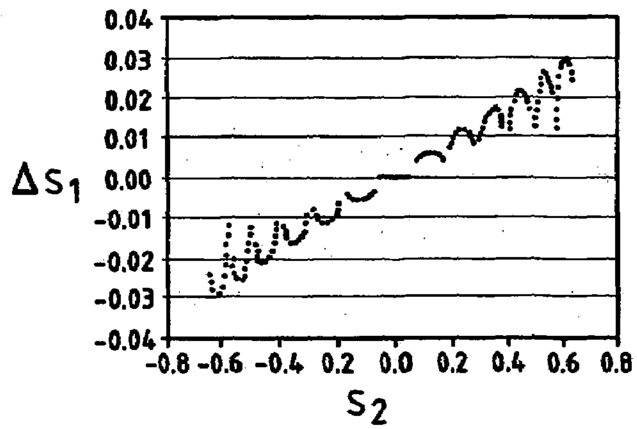
FIGS. 2 and 3 are graphs illustrating an aspect of the invention.

For a measuring installation A, it is possible to determine the error in measurement signal $S_1$ as a function of measurement signal $S_2$. The graph of FIG. 2 represents this error $\Delta$ on measurement signal $S_1$ as a function of measurement signal $S_2$. It emerges from this graph that the error $\Delta S_1$ is globally a linear function of measurement signal $S_2$. It is thus possible, knowing measurement signals $S_1$ and $S_2$, to specify a corrected measurement signal for sensor $1_1$ such that $S_{1c}=S_1+aS_2$.

Likewise, it is possible to specify a corrected measurement signal for sensor $1_2$, such that $S_{2c}=S_2+a'S_1$, where a and a' are correction coefficients.

It should be noted that such a corrected signal $S_{1c}$, $S_{2c}$ remains affected by errors because of the linear approximation of the correction made (correction of order n=1).

Figure 3:
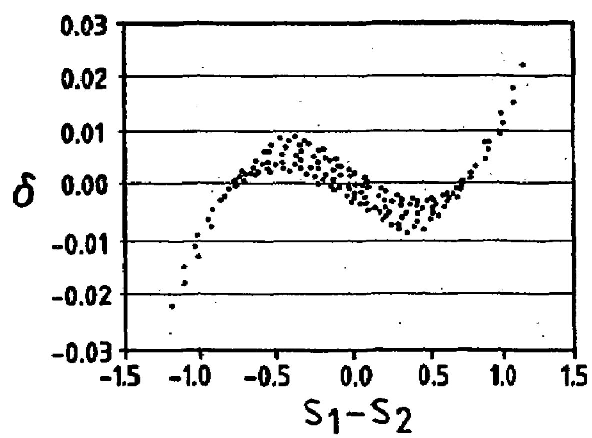

The residual error $\delta$ after this correction of order 1 is shown in FIG. 3, as a function of the difference between signals $S_1-S_2$. This residual error can, for example, be approximated by a polynomial of order 3 on $(S_1-S_2)$, in which the coefficients of the even exponents are zero. Thus, it is possible, for a correction order of order 3 (n=3) to calculate a corrected signal such that:

$$S_{1c}=(1+c)S_1+(a-c)S_2+3bS_1S_2^2-3bS_1^2S_2+bS_1^3-bS_2^3$$

and $$S_{2c}=(1+c')S_2+(a'-c')S_1+3b'S_2S_1^2-3bS_2^2S_1+b'S_2^3-b'S_1^3$$

or $$S_{1c}=S_1+aS_2+b(S_1-S_2)^3+c(S_1-S_2)$$

and $$S_{2c}=S_2+a'S_1+b'(S_1-S_2)^3+c'(S_2-S_1)$$

where b, c, b', and c' are correction coefficients.

In general, it is possible to specify a corrected measurement signal for each measuring sensor such that:

$$S_{1c}=\sum_{i-1}^{n}\left(\sum_{j=0}^{i}\alpha_{ij}S_1^jS_2^{i-j}\right)$$

$$S_{2c}=\sum_{i=1}^{n}\left(\sum_{j=0}^{i}\alpha'_{ij}S_2^jS_1^{i-j}\right)$$

where $\alpha$ and $\alpha'$ are correction coefficients and n is the correction order.

For a correction order of order 3 (n=3), $\alpha$, i, j and $\alpha'$ are such that:

$$\alpha_{10}=a-c,\ \alpha_{11}=1+c$$

$$\alpha'_{10}=a'-c',\ \alpha'_{11}=1+c'$$

$$\alpha_{20}=0=\alpha'_{20},\ \alpha_{21}=\alpha'_{21}=0,\ \alpha_{22}=\alpha'_{22}=0$$

$$\alpha_{30}-b,\ \alpha_{31}=3b,\ \alpha_{32}=-3b,\ \alpha_{33}=b$$

$$\alpha'_{30}=-b',\ \alpha'_{31}=3b',\ \alpha'_{32}=-3b',\ \alpha'_{33}=b'$$

so that $$S_{1c}=(1+c)S_{1+(}a-c)S_2+3bS_1S_2^2-3bS_1^2S_2+bS_1^3-bS_2^3$$

$$S_{2c}=(1+c')S_2+(a'-c')S_1+3b'S_2S_1^2-3b'S_2^2S_1+b'S_2^3-b'S_1^3$$

or $$S_{1c}=S_1+aS_2+b(S_1-S_2)^3+c(S_1-S_2)$$

and $$S_{2c}=S_2+a'S_1+b'(S_2-S_1)^3+c'(S_2-S_1)$$

For a correction order of 1, the values of $\alpha$, i, j and $\alpha'$ are such that:

$$\alpha_{10}=a,\ \alpha_{11}=1,\ \alpha'_{10}=a',\ \text{and}\ a'_{11}=1$$

It emerges from the above description that the resources for processing the signals enable one to correct the interference errors in a measuring installation A that includes two magnetic sensors for measuring the position of mobile elements $2_1$, $2_2$ that are moving close to each other. Of course the subject of the invention can be applied equally well to a measuring installation A that includes more than two magnetic measuring sensors.

Figure 4:
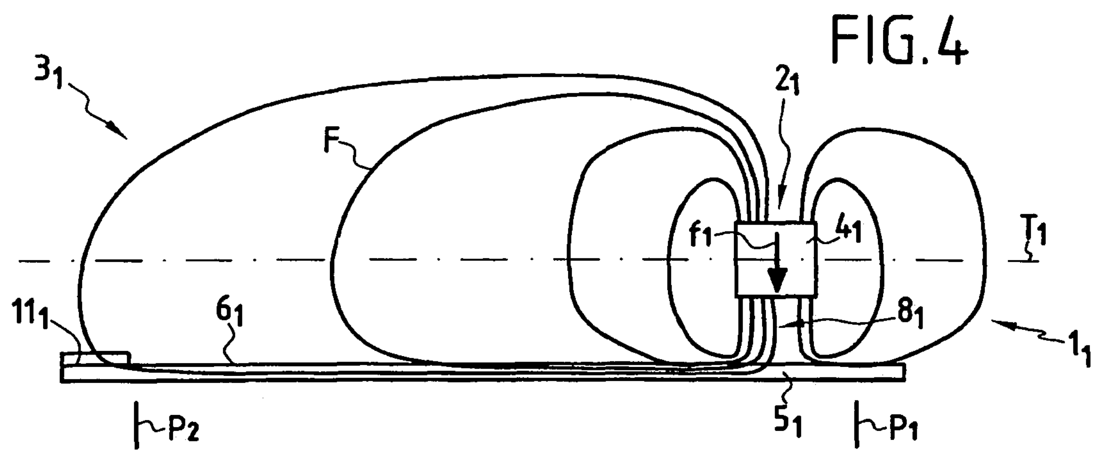
FIG. 4 is a diagrammatic view showing the principle of a sensor implemented within the scope of the invention.

Each magnetic sensor $1_1$, $1_2$ can be implemented in any known manner in order to measure the position of a mobile element that is moving along a given trajectory. FIG. 4 shows a preferred implementation example of a magnetic sensor $1_1$ designed to determine the position of a mobile element $2_1$ in the general sense, travelling along a movement axis $T_1$ which, in the example illustrated, is a translation axis. The mobile element $2_1$ is composed of any type of device having, in the example illustrated, a linear course forming part, preferably though not exclusively, of a device fitted to a motor vehicle. In the remainder of the description, the mobile element $2_1$ is considered to have a linear course, though it is clear that the subject of the invention can apply to a mobile element $2_1$ having a different course of movement, such as a circular one. In general, the mobile element $2_1$ moves along the movement axis $T_1$ between two end points, denoted $P_1$ and $P_2$ in the example illustrated in FIG. 4.

The sensor $1_1$ includes a fixed magnetic circuit $3_1$ that includes resources $4_1$ for the creation of a magnetic flux which, in the example illustrated, is oriented in a direction $f_1$ perpendicular to the translation axis $T_1$. The magnetic circuit $3_1$ also includes at least one first polar part $5_1$ having a surface $6_1$ that lies more or less perpendicularly to the direction $f_1$ of the magnetic flux and parallel to the translation axis $T_1$.

The resources $4_1$ for the creation of the magnetic flux are mounted to be movable by the mobile element $2_1$ creating a magnetic gap $8_1$ with the first polar part $5_1$. The magnetic flux creation resources $4_1$ are preferably composed of a magnet forming part, or assembled in any appropriate manner to the mobile element $2_1$ whose position will be determined along the movement axis $T_1$. The magnet $4_1$ thus delivers a magnetic flux that is oriented perpendicularly to the surface $6_1$ of the first polar part $5_1$. It should be noted that it is possible to obtain a magnetic flux oriented perpendicularly to the surface $6_1$ of the first polar part $5_1$ with a magnet whose direction of magnetisation is parallel to the translation axis.

It should be considered that the polar part $5_1$ has a length that is least equal to the course to be measured of the mobile element $2_1$, determined between the end points $P_1$ and $P_2$. Apart from this, as will be seen from the description that follows, the first polar part $5_1$ is made from a material that is chosen to limit the hysteresis effect, and with the appropriate dimensions to prevent reaching its magnetic saturation value.

The sensor $1_1$ includes at least one first measuring cell $11_1$, mounted in the magnetic circuit $3_1$ and able to measure the value of the magnetic flux in relation to the first polar part $5_1$. Such a measuring cell $11_1$, like a Hall-Effect cell for example, is able, at a given fixed position, to measure variations in the value of the magnetic flux flowing in the magnetic circuit. In the example illustrated in FIG. 4, the measuring cell $11_1$ is mounted close to a movement end point $P_2$. More precisely the measuring cell $11_1$ is mounted outside the course of the mobile element $2_1$ and close to a movement end point.

It should be understood that the cell $11_1$ measures the magnetic flux delivered by the magnet $4_1$ less the magnetic leakage flux of which some field lines F are shown in FIG. 4. The cell $11_1$ thus measures the residual magnetic flux at one end of movement, this residual magnetic flux being equal to the total flux of the magnet $4_1$ less the direct magnetic leakage flux between the magnetic circuit $3_1$ and the magnet $4_1$. In the measurements where the leakage flux is dependent, in a monotone manner, on the relative positions of the magnet $4_1$ and the cell $11_1$, the output signal delivered by the cell $11_1$ provides information on the position of the magnet $4_1$, and therefore of the mobile element $2_1$ along the translation axis $T_1$. Of course, this measurement is possible if the magnetic circuit, and in particular the polar part $5_1$, is not saturated. The output signal delivered by the measuring cell $11_1$ is transmitted to signal processing resources, such as those described above, and used to determine the linear position of the mobile element $2_1$ along the movement axis $T_1$.

Figure 5:
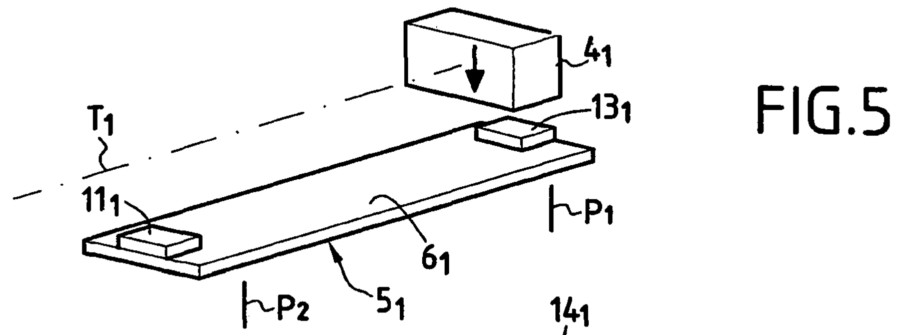
FIG. 5 is a diagrammatic view in perspective showing a preferred implementation variant of the sensor used.

According to a preferred implementation characteristic, the sensor $1_1$ includes a second measuring cell $13_1$, mounted in a fixed manner in the magnetic circuit $3_1$ close to the other end point, namely $P_1$, in the example illustrated in FIG. 5. As explained above, the cells $11_1$ and $13_1$, are placed outside the course shown between points $P_1$ and $P_2$. This second measuring cell $13_1$ is also able to measure the magnetic flux delivered by the magnet $4_1$ less the magnetic leakage flux. It should be noted that in the examples illustrated, the measurement cells $11_1$ and $13_1$ are fixed to the polar part $5_1$. Of course, the measurement cells $11_1$, $13_1$ can be placed close to the end points $P_1$ and $P_2$ without being in direct contact with the polar part $5_1$.

The creation of a magnetic sensor $1_1$ that has two measurement cells $11_1$, $13_1$ allows one to obtain a differential measurement structure with a view to improving the linearity of the output signal $S_a$, $S_b$ of the measurement cells.

According to one implementation characteristic, one can envisage that, in order to determine the position of the mobile element $2_1$, the processing resources calculate the difference between the output signals $S_a$, $S_b$ delivered by the first $11_1$ and the second $13_1$ measurement cells, divided by the sum of the output signals delivered by the first $11_1$ and the second $13_1$ measurement cells. Therefore $S_1=S_a-S_b/S_a+S_b$, where $S_a$ and $S_b$ are the elementary measurement signals delivered by the pair of measurement cells $11_1$, $11_3$. Such a process allows one to obtain an output signal which is not very sensitive to variations in the signals delivered by the cells $11_1$, $13_1$ due, for example, to variations in the magnetic gap or the temperature.

Figure 6:
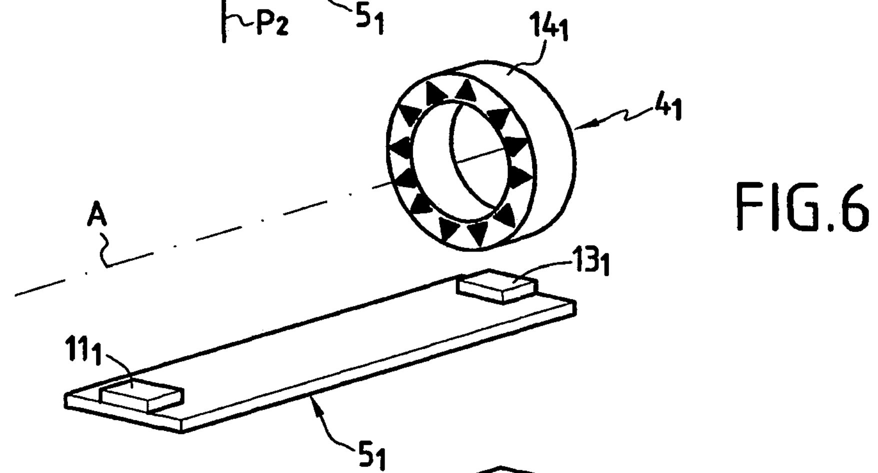
FIGS. 6 and 7 are views in perspective showing diverse forms of implementation of the magnetic flux creation resources.
Figure 7:
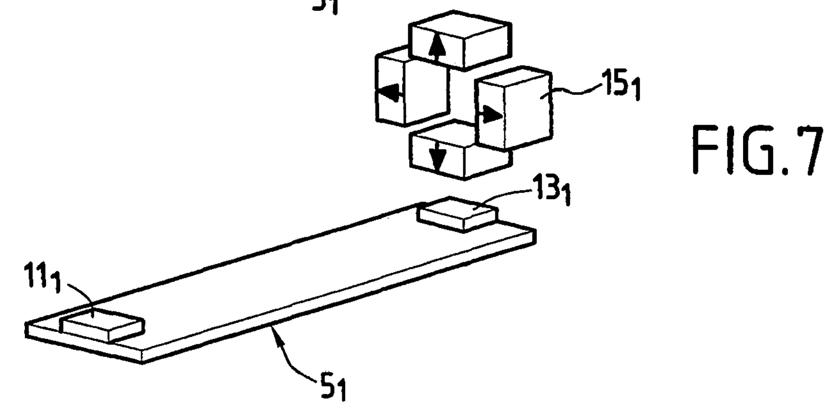

In the example illustrated in FIGS. 4 and 5, the magnetic flux creation resources $4_1$ are implemented by means of a magnet whose direction of magnetisation is perpendicular to the surface $6_1$ of the first polar part $5_1$. In the case where the mobile element $2_1$ also undergoes a rotation along the axis $T_1$, it is possible to envisage, as illustrated in FIG. 6, creating the magnetic flux creation resources $4_1$ by means of an annular element $14_1$ or in the form of a radially magnetised disk whose axis $A_1$ is parallel to the movement axis $T_1$. In the example illustrated in FIG. 7, the resources $4_1$ for creation of the magnetic flux are composed of a series of at least four magnets $15_1$ whose directions of magnetisation are shifted, two by two, by 90°.

Figure 8:
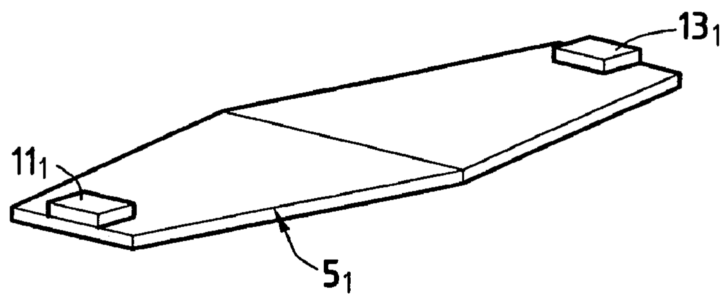
FIGS. 8 and 9 illustrate two outline implementation variants of polar parts capable of being implemented by a sensor within the scope of the invention.
Figure 9:
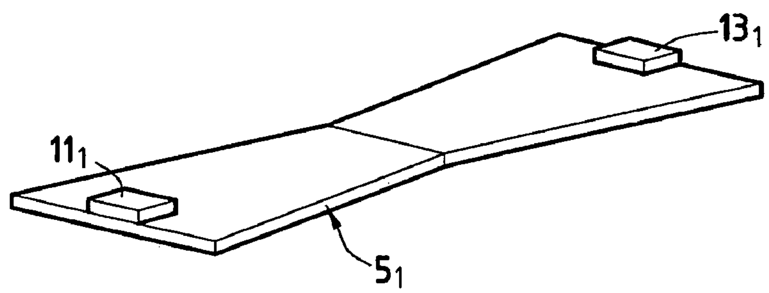

According to an advantageous characteristic illustrated more precisely in FIGS. 8 and 9, the polar part $5_1$ can have a plane profile designed to improve the linearity of the output signal delivered by the measurement cells $11_1$, $13_1$. As an example, the polar part $5_1$ can have a symmetrical area formed by two truncated cones mounted end to end with their wider bases joined (FIG. 8) or with their small bases joined (FIG. 9).

Figure 10:
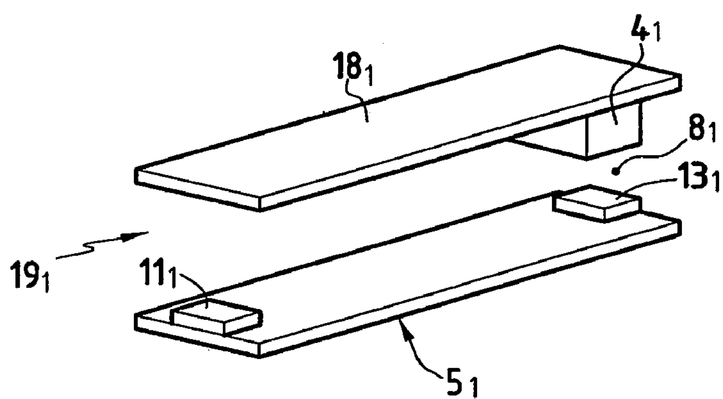
FIGS. 10 and 11 are views in perspective of two implementation variants of the sensor within the scope of the invention.

FIG. 10 illustrates another implementation variant of the sensor implementing a second polar part $18_1$ that can be identical or not to the first polar part $5_1$, and used to limit the magnetic leakage, meaning that it is used to channel the magnetic flux in the magnetic circuit $3_1$. In the example illustrated in FIG. 10, the second polar part $18_1$ includes a plane surface placed opposite to the first polar part $5_1$ forming, together with the latter, a magnetic gap $19_1$ at one of its ends. The other end of this second polar part $18_1$ is equipped with a magnet $4_1$ which also forms a small magnetic gap $8_1$ with the first polar part $5_1$.

Figure 11:
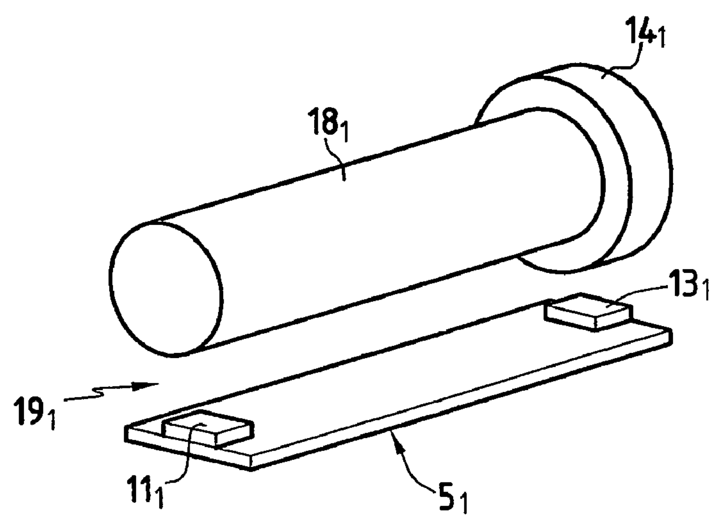

FIG. 11 illustrates another form of implementation of the second polar part $18_1$, created with a tubular element on which the radially magnetised annular element $14_1$ is mounted as illustrated in FIG. 6. This second polar part $18_1$ also forms a magnetic gap $19_1$ with the first polar part $5_1$.

In the preceding description, only sensor $\mathbf{1}_1$ was described precisely. Of course, the second sensor $\mathbf{1}_2$, which can be created in the same way as sensor $\mathbf{1}_1$, will not be described in greater detail, to the extent that it has the same component elements but with the index 2 instead of the index 1. The second sensor $\mathbf{1}_2$ thus delivers two elementary measurement signals Sc, Sd.

The invention is not limited to the examples described and illustrated, since diverse modifications can be made to it without moving outside of its scope.

The invention claimed is:

1. A device to correct interference errors in a measuring installation (A), comprising:

at least two magnetic sensors ($\mathbf{1}_1$, $\mathbf{1}_2$) for measuring the position of mobile elements ($\mathbf{2}_1$, $\mathbf{2}_2$) that are moving along adjacent trajectories, where each magnetic measuring sensor ($S_1$, $S_2$) delivers a measurement signal that is representative of the position of the mobile element in an open magnetic circuit ($\mathbf{3}_1$, $\mathbf{3}_2$), and resources (M) for processing the measurement signals delivered by the magnetic measuring sensors, wherein the processing resources (M) include resources for correction of the magnetic measurement signals in order to take account of interference errors between the adjacent magnetic sensors ($\mathbf{1}_1$, $\mathbf{1}_2$) with a view to obtaining a corrected measurement signal ($S_{1c}$, $S_{2c}$) for each magnetic measuring sensor.

2. A device according to claim 1, wherein the correction resources correct the measurement signal ($S_1$, $S_2$) of each magnetic measuring sensor ($\mathbf{1}_1$, $\mathbf{1}_2$) according to the value of the measurement signals of the magnetic measuring sensor concerned and of the other magnetic measuring sensors.

3. A device according to claim 1, wherein the processing resource (M) deliver a corrected measurement signal for each magnetic measuring sensor such that:

$$S_{1c} = \sum_{i-1}^{n}\left(\sum_{j=0}^{i} \alpha_{ij} S_1^j S_2^{i-j}\right)$$

$$S_{2c} = \sum_{i=1}^{n}\left(\sum_{j=0}^{i} \alpha'_{ij} S_2^j S_1^{i-j}\right)$$

where α, α' are correction coefficients and n is the correction order.

4. A device according to claim 3, wherein, for each magnetic measuring sensor ($\mathbf{1}_1$, $\mathbf{1}_2$), the processing resources (M) deliver a corrected measurement signal such that for a correction order of n=3, α, i, j and α' are such that:

$$\alpha_{10}=a-c,\ \alpha_{11}-1+c$$

$$\alpha'_{10}=a'-c',\ \alpha'_{11}=1+c'$$

$$\alpha_{20}=0=\alpha'_{20},\ \alpha_{21}=\alpha'_{21}=0,\ \alpha_{22}=\alpha'_{22}=0$$

$$\alpha_{30}=-b,\ \alpha_{31}=3b,\ \alpha_{32}=-3b,\ \alpha_{33}=b$$

$$\alpha'_{30}=-b',\ \alpha'_{31}-3b',\ \alpha'_{32}=-3b',\ \alpha'_{33}=b'$$

where a, b, c, a', b', c' are correction coefficients so that:

$$S_{1c}=(1+c)S_{1+}(a-c)S_{2+}3bS_1S_2^2-3bS_1^2S_{2+}bS_1^3-bS_2^3$$

$$S_{2c}=(1+c')S_2+(a'-c')S_1+3b'S_2S_1^2-3b'S_2^2S_1+b'S_2^3-b'S_2^3-b'S_1^3$$

or $$S_{1c}=S_1+aS_2+b(S_1-S_2)^3+c(S_1-S_2)$$

and $$S_{2c}=S_2+a'S_1+b'(S_2-S_1)^3+c'(S_2-S_1).$$

5. A device according to claim 3, wherein, for each magnetic measuring sensor ($\mathbf{1}_1$, $\mathbf{1}_2$), the processing resources (M) deliver a corrected measurement signal such that, for a correction order of n=1, the values of α, α', i, and j are such that: $\alpha_{10}$=a, $\alpha_{11}$=a' and $\alpha'_{10}$=a', $\alpha'_{11}$=1 so that:

$$S_{10}=S_1+aS_2,\ \text{and}\ S_{2c}=S_2+a'S_1.$$

6. A device according to claim 1, wherein each measurement signal $S_1$, $S_2$ is such that:

$$S_1 = \frac{S_a - S_b}{S_a + S_b}$$

$$S_2 = \frac{S_d - S_c}{S_d + S_c}$$

where $S_a$, $S_b$, and $S_c$, $S_d$ are a pair of elementary measurement signals delivered by a pair of measurement cells mounted in the open magnetic circuit.

7. A measuring installation comprising:

a first magnetic measuring sensor ($\mathbf{1}_1$) delivering a first measurement signal ($S_1$) for the position of a first mobile element ($\mathbf{2}_1$) that is moving along a trajectory ($T_1$), where the value of the first measurement signal ($\mathbf{3}_1$) depends on the position of the said mobile element in an open magnetic circuit ($\mathbf{3}_1$), at least one second magnetic measuring sensor ($\mathbf{1}_2$) delivering a second magnetic measurement signal ($S_2$) for the position of a second mobile element ($\mathbf{2}_2$) that is moving along a trajectory ($T_2$) adjacent to the movement trajectory ($T_1$) of the first mobile element, where the value of the second measurement signal ($S_2$) depends on the position of the said mobile element in an open magnetic circuit ($\mathbf{3}_2$)

and a correction arrangement according to claim 1.

8. A measuring installation according to claim 7, wherein each magnetic measuring sensor ($\mathbf{1}_1$, $\mathbf{1}_2$) includes resources ($\mathbf{4}_1$, $\mathbf{4}_2$) for the creation of a magnetic flux in a direction perpendicular to the surface ($\mathbf{5}_1$, $\mathbf{5}_2$) of at least one polar part from which there emanates a magnetic leakage flux whose strength varies with the surface area of the polar part along the movement axis, where these magnetic flux creation resources ($\mathbf{4}_1$, $\mathbf{4}_2$) are mounted to be movable by the mobile element, forming at least one magnetic gap ($\mathbf{8}_1$, $\mathbf{8}_2$) with a polar part forming part of the open magnetic circuit, with each magnetic measuring sensor including at least one measuring cell ($\mathbf{11}_1$, $\mathbf{11}_2$) mounted in a fixed manner in the magnetic circuit close to an end point of the trajectory so as to measure the magnetic flux delivered by the creation resources less a magnetic leakage flux appearing from tho polar part and varying along the trajectory.

9. A measuring installation according to claim 8, wherein the magnetic flux creation resources ($\mathbf{4}_1$, $\mathbf{4}_2$) of the two measuring sensors are mounted close to each other along parallel trajectories.

10. A measuring installation according to claim 8, wherein each magnetic measuring sensor ($\mathbf{1}_1$, $\mathbf{1}_2$) includes a second measuring cell ($\mathbf{13}_1$, $\mathbf{13}_2$) mounted in a fixed manner in the magnetic circuit ($\mathbf{3}_1$, $\mathbf{3}_2$) close to the other trajectory end point, so as to measure the magnetic flux delivered by the creation resources ($\mathbf{4}_1$, $\mathbf{4}_2$) less the magnetic leakage flux.

11. A measuring installation according to claim 8, wherein the magnetic flux creation resources ($\mathbf{4}_1$, $\mathbf{4}_2$) are mounted to be movable in translation.

12. A measuring installation according to claim 11, wherein the magnetic flux creation resources ($\mathbf{4}_1$, $\mathbf{4}_2$) are composed of a radially or axially magnetised disk-shaped or annular element ($\mathbf{14}_1$, $\mathbf{14}_2$) whose axis is parallel to the movement axis in translation.

13. A measuring installation according to claim 11, wherein the magnetic flux creation resources are composed of a series of at least four magnets ($\mathbf{15}_1$, $\mathbf{15}_2$) whose directions of magnetisation are shifted, two by two, by 90'.

14. A measuring installation according to claim 11, wherein the open magnetic circuit ($\mathbf{3}_1$, $\mathbf{3}_2$) includes a second polar part ($\mathbf{18}_1$, $\mathbf{18}_2$) placed opposite to the first polar part ($\mathbf{5}_1$, $\mathbf{5}_2$) forming together with the latter, a magnetic gap ($\mathbf{19}_1$, $\mathbf{19}_2$).

15. A measuring installation according to claim 14, wherein the second polar part ($\mathbf{18}_1$, $\mathbf{18}_2$) is equipped with resources for creation of the magnetic flux ($\mathbf{4}_1$, $\mathbf{4}_2$).

16. A measuring installation according to claim 14, wherein the second polar part ($\mathbf{18}_1$), $\mathbf{18}_2$) is formed by a tubular element fitted with the radially magnetised annular element ($\mathbf{14}_1$, $\mathbf{14}_2$).

17. A measuring installation according to claim 14, in that wherein one or the other of the polar parts ($\mathbf{5}_1$, $\mathbf{18}_1$-$\mathbf{5}_2$, $\mathbf{18}_2$) has a plane profile designed to improve the linearity of the output signal delivered by the measurement cells ($\mathbf{11}_1$, $\mathbf{13}_1$-$\mathbf{11}_2$, $\mathbf{13}_2$).

* * * * *